United States Patent [19]

Temple et al.

[11] Patent Number: 5,492,731
[45] Date of Patent: Feb. 20, 1996

[54] THERMALLY CURABLE COATING COMPOSITION

[75] Inventors: Rodger G. Temple, Sarver; Henry H. Crum, III, Gibsonia; Jonathan T. Martz, Glenshaw, all of Pa.

[73] Assignee: PPG Industries, Inc., Pittsburgh, Pa.

[21] Appl. No.: 701,948

[22] Filed: May 17, 1991

[51] Int. Cl.$^6$ ............................... B05D 3/02; B05D 1/36; B05D 1/02

[52] U.S. Cl. .................. 427/407.1; 427/409; 427/388.2; 205/198

[58] Field of Search ................................. 427/409, 407.1, 427/412.1, 412.5, 385.5, 388.2; 205/198

[56] References Cited

U.S. PATENT DOCUMENTS

| | | | |
|---|---|---|---|
| 4,025,407 | 5/1977 | Chang et al. | 204/159.14 |
| 4,147,679 | 4/1979 | Scriven | 428/262 |
| 4,377,457 | 3/1983 | Boeckeler et al. | 204/159.16 |
| 4,425,468 | 1/1984 | Makhlouf et al. | 524/710 |
| 4,463,038 | 7/1984 | Takeuchi et al. | 427/407.1 |
| 4,504,374 | 3/1985 | Lewarchik et al. | 204/181 C |
| 4,515,919 | 5/1985 | Bradley et al. | 427/388.4 |
| 4,524,192 | 6/1985 | Alexander et al. | 427/412.5 |
| 4,533,717 | 8/1985 | O'Connor et al. | 528/78 |
| 4,634,602 | 1/1987 | Sirkoch et al. | 427/44 |
| 4,756,975 | 7/1988 | Fujii et al. | 427/409 |
| 4,766,177 | 8/1988 | Miller et al. | 525/131 |
| 4,859,743 | 8/1989 | Ambrose et al. | 427/385.5 |
| 4,971,837 | 11/1990 | Martz et al. | 422/388.2 |
| 5,126,170 | 6/1992 | Zwiener et al. | 427/385.5 |

*Primary Examiner*—Diana Dudash
*Attorney, Agent, or Firm*—William J. Uhl

[57] ABSTRACT

A composition is disclosed which includes a urethane resin containing reactive ethylenically unsaturated groups and hydroxyl groups, which is preferably derived by reacting a polyisocyanate and an isocyanate reactive group-containing unsaturated monomer selected from the group consisting of hydroxyalkyl acrylates, hydroxyalkyl methacrylates, hydroxyalkyl acrylamides, hydroxy functional allylic compounds, and mixtures thereof to form an isocyanate group-containing reaction product which is then reacted with an organic polyol wherein the equivalent number of hydroxyl groups is in excess compared with the equivalent number of isocyanate groups. The composition also includes an aminoplast resin for reaction with hydroxyl groups on the urethane resin in an amount of less than about 10% by weight based on solids of the composition which is effective in thin film curing of the composition. The composition can also optionally include a thermally activated free radical initiator and a cure-promoting catalyst different from the free radical initiator; such as a metal soap. A method is also disclosed of applying a layer of the composition in which a portion of the layer is a thin film. The method is particularly useful in applying the composition to a substrate which is coated with a cationically electrodeposited primer. The composition and method of the invention are particularly useful for making a chip resistant coating and obtaining good cure at thin film layers of the composition.

7 Claims, No Drawings

THERMALLY CURABLE COATING COMPOSITION

FIELD OF THE INVENTION

The present invention is directed toward coating compositions useful as chip resistant coatings and more particularly, chip resistant coatings which have good thin film cure characteristics in automotive applications.

BACKGROUND OF THE INVENTION

Damage to automotive vehicle coatings due to the impact of road debris on vehicles is a recognized problem. Certain portions of vehicles are more susceptible to such damage because they are in a direct line of flight for gravel, stones and other debris. For example, the lower side panels of cars are frequently damaged in this way.

To address this problem, it is known to use a two layer chip resistant coating system on vehicle parts over electrodeposited primer coatings. For example, U.S. Pat. No. 4,971,837 to Martz et al. discloses a wet on wet application and cure process for making a chip resistant coating. This process involves applying a second coating composition onto a first coating composition while the first is still uncured and then curing both layers at an elevated temperature.

Such wet on wet two coat systems, if used on the entire surface area of the vehicle, can increase costs and application complexity. Therefore, such wet on wet systems may be used only on limited vehicle areas most susceptible to damage from road debris. Typically, at the interface between a two coat portion of a vehicle and a one coat portion of a vehicle there is a transition zone in which the additional coat in a two coat system is feathered out. In the case in which the additional coat is a free-radically intiated curable coating composition, such feathering out can lead to curing problems. For example, at thin film thicknesses in the feathering out zone, cure can be inhibited by oxygen. Such coating compositions are also susceptible to cure inhibition by cationically electrodeposited primer compositions which are typically applied prior to application of anti-chip coatings.

The present invention addresses the foregoing problems present in the industry and provides a chip-resistant coating having good thin film cure and useful in wet on wet applications.

SUMMARY OF THE INVENTION

The present invention is directed toward a composition which is useful for making chip resistant coatings. The composition includes a urethane resin containing reactive ethylenically unsaturated groups and hydroxyl groups. The composition also includes an aminoplast resin for reaction with hydroxyl groups on the urethane resin in an amount of less than about 10% by weight based on resin solids of the composition which is effective in curing thin films of the composition. The coating composition is a thermosetting resin and can include a thermally activated free radical initiator. The composition can also include a cure-promoting catalyst different from the free radical initiator, such as a metal soap.

In a preferred embodiment of the invention, the urethane resin is derived by reacting a polyisocyanate and an isocyanate reactive group-containing unsaturated monomer selected from the group consisting of hydroxyalkyl acrylates, hydroxyalkyl methacrylates, hydroxyalkyl acrylamides, hydroxy functional allylic compounds, and mixtures thereof to form an isocyanate group-containing reaction product which is subsequently reacted with an organic polyol such that the number of equivalent hydroxyl groups on the polyol are in excess compared to the number of equivalent isocyanate groups.

The present invention is also directed toward a method of applying a chip resistant coating to a substrate. This method includes applying a layer of a coating composition which includes a urethane resin containing reactive ethylenically unsaturated groups and hydroxyl groups and an aminoplast resin for reaction with the hydroxyl groups of the urethane resin. The method further includes heating the coating composition at an elevated temperature sufficient to cure the coating composition. The method can also include use of a substrate which is coated with a cationically electrodeposited coating composition prior to the step of applying the coating composition. The method is particularly useful when at least a portion of the layer of the coating composition is less than about 1 mil thick. In a preferred embodiment of the method, prior to curing the first coating composition, a layer of a second coating composition is applied thereon and the step of heating cures both the first and second coating compositions.

DETAILED DESCRIPTION OF THE INVENTION

The composition of the present invention includes a urethane resin containing reactive ethylenically unsaturated groups and hydroxyl groups. It should be noted that the reactive ethylenic unsaturation on the urethane resin can be terminal, pendant or integral to the urethane backbone. Although the urethane resin is preferably prepared by the reaction process discussed in detail below, it can be prepared by other reactions provided it otherwise meets the defined parameters of the composition. The urethane resin is typically in the present composition in an amount of from about 25 weight percent to about 96 weight percent, more preferably from about 35 weight percent to about 75 weight percent, and most preferably from about 40 weight percent to about 60 weight percent based on total weight of resin solids.

The urethane resin is preferably prepared by reacting a polyisocyanate and an isocyanate reactive group-containing unsaturated monomer selected from the group consisting of hydroxyalkyl acrylates, hydroxyalkyl methacrylates, hydroxyalkyl acrylamides, hydroxy functional allylic compounds, and mixtures thereof to form an isocyanate group-containing reaction product which is reacted with an organic polyol such that the number of equivalent hydroxyl groups on the polyol are in excess compared with the equivalent number of isocyanate groups. It should be noted that the foregoing monomers can be either monohydroxy or polyhydroxy. In the case of monohydroxy, the resulting urethane will contain terminal unsaturation and that in the case of polyhydroxy monomers, the unsaturation will be pendant to the urethane polymer.

Preferably, the urethane resin of the present invention, in the case of a resin derived from acrylate or methacrylate monomers (collectively referred to herein as "(meth)acrylate" monomers), has a (meth)acrylate equivalent weight of at least about 400, more preferably at least about 500, and most preferably at least about 650. A preferred (meth)acrylate equivalent weight range is 500–700. As used herein, the term (meth)acrylate equivalent weight of a resin refers to the weight of the solid components from which the resin is prepared divided by the (meth)acrylate equivalents of the (meth)acrylate monomer used to prepared the resin.

The polyisocyanates of the present invention for preparing the urethane resin can be aliphatic, aromatic, cycloaliphatic or heterocyclic isocyanates. Representative examples are the aliphatic isocyanates such as trimethylene, tetramethylene, pentamethylene, hexamethylene, 1,2-propylene, 1,2-butylene, 2,3-butylene and 1,3-butylene diisocyanates; the cycloalkylene compounds such as 1,3-cyclopentane, 1,4-cyclohexane, 1,2-cyclohexane diisocyanates and isophorone diisocyanates; the aromatic compounds such as m-phenylene, p-phenylene, 4,4'-diphenyl, 1,5-naphthalene and 1,4-naphthalene diisocyanates; the aliphatic-aromatic compounds such as 4,4'-diphenylene methane, 2,4- or 2,6-tolylene, or mixtures thereof, 4,4'-toluidine, tetramethyl xylylene, and xylylene diisocyanates; the nuclear-substituted aromatic compounds such as dianisidine diisocyanate, 4,4'-diphenylether diisocyanate and chlorodiphenylene diisocyanate; the triisocyanates such as triphenyl methane-4,4',4"-triisocyanate, 1,3,5-triisocyanato benzene and 2,4,6-triisocyanato toluene; and the tetraisocyanates such as 4,4'-dimethyldiphenyl methane-2,2',5,5'-tetraisocyanate; the polymerized polyisocyanates such as tolylene diisocyanate dimers and trimers, and the like.

In addition, the polyisocyanates can be a prepolymer derived from a polyol including polyether polyol or polyester polyol, including polyols which are reacted with excess polyisocyanates to form isocyanate-terminated prepolymers. These may be simple polyols such as glycols, e.g., ethylene glycol and propylene glycol, as well as other polyols such as glycerol, trimethylolpropane, hexanetriol, pentaerythritol, and the like, as well as glycol ethers such as diethylene glycol, tripropylene glycol and the like and polyethers, i.e., alkylene oxide condensates of the above. Among the alkylene oxides that may be condensed with these polyols to form polyethers are ethylene oxide, propylene oxide, butylene oxide, styrene oxide and the like. These are generally called hydroxy-terminated polyethers and can be linear or branched. Examples of polyethers include polyoxyethylene glycol having a molecular weight of 1540, polyoxypropylene glycol having a molecular weight of 1025, polyoxytetramethylene glycol, polyoxyhexamethylene glycol, polyoxynonamethylene glycol, polyoxydecamethylene glycol, polyoxydodecamethylene glycol and mixtures thereof. Other types of polyoxyalkylene glycol ethers can be used. Especially useful polyether polyols are those derived from reacting polyols such as ethylene glycol, diethylene glycol, triethylene glycol, 1,4-butylene glycol, 1,3-butylene glycol, 1,6-hexanediol, and their mixtures; glycerol, trimethylolethane, trimethylolpropane, 1,2,6-hexanetriol, pentaerythritol, dipentaerythritol, tripentaerythritol, polypentaerythritol, sorbitol, methyl glucosides, sucrose and the like with alkylene oxides such as ethylene oxide, propylene oxide, their mixtures, and the like.

The polyisocyanates described above are reacted with isocyanate reactive group-containing unsaturated monomers selected from hydroxyalkyl acrylates, hydroxyalkyl methacrylates, hydroxyalkyl acrylamides, hydroxy functional allylic compounds, and mixtures thereof wherein hydroxyl functionality of the monomer reacts with the isocyanate groups. Examples of the isocyanate reactive group-containing unsaturated monomers include: hydroxyethyl acrylate, hydroxypropyl acrylate, hydroxyethyl methacrylate, hydroxypropyl methacrylate, dihydroxypropyl acrylate, hydroxyethyl acrylamide, hydroxypropyl acrylamide, butanediol monoacrylate, the adduct of 1 mole of hydroxyethyl acrylate with 2 moles of epsilon-caprolactone, and the like. The reaction is carried out using methods well known in the art.

The reaction is preferably carried out such that the equivalent ratio of isocyanate functionality to hydroxyl functionality on the isocyanate reactive group-containing unsaturated monomer is preferably about 2.5-1.5:1, more preferably about 2.2-1.8:1, most preferably about 2.0:1. In this manner, the resulting reaction product includes an isocyanate group.

As an alternative to the reaction product of a polyisocyanate and an isocyanate reactive group-containing monomer, it is possible to use a monofunctional isocyanate having ethylenic unsaturation. For example, well known ethylenically unsaturated functional monoisocyanates include meta-isopropenyl-α,α-dimethylbenzene isocyanate (TMI) and isocyanatoethyl methacrylate (IEM).

The reaction product of the polyisocyanate and the isocyanate reactive group-containing monomer is reacted with an organic polyol with hydroxyl equivalents from the organic polyol being in excess with respect to remaining isocyanate functionality on the reaction product. In this manner, hydroxyl functionality on the polyol reacts with remaining isocyanate functionality to form urethane linkages. By having an excess of hydroxyl equivalents, unreacted hydroxyl groups remain after complete reaction with isocyanate groups. Such remaining hydroxyl groups are important for subsequent reaction with the aminoplast resin of the present invention. It should be noted that an excess of hydroxyl equivalents is only considered with respect to isocyanate groups which are available for reaction. For example, non-reactive isocyanate groups such as blocked isocyanate groups or sterically hindered isocyanate groups which do not react completely with hydroxyl functionality available from the polyol are not considered in determining the relative amounts of reactants in the present composition. Specifically, the ratio of hydroxyl functionality on the polyol to remaining isocyanate functionality is typically 1.5-1.01:1 and more preferably 1.3-1.1:1.

Examples of polyols which are useful in the present composition include: organic polyols in the broad classes such as: simple diols, triols, and higher hydric alcohols; polyester polyols; polyether polyols; amide-containing polyols; acrylic polyols; epoxy polyols; polyhydric polyvinyl alcohols; and urethane polyols. Polyether polyols are preferred.

The simple diols, triols, and higher hydric alcohols are generally known, examples of which include: ethylene glycol; propylene glycol; 1,2-butanediol; 1,3-butanediol; 1,4-butanediol; 2,2,4-trimethyl,3-pentanediol; 1,5-pentanediol; 2,4-pentanediol; 1,6-hexanediol; 2,5-hexanediol; 2-methyl-1,3-pentanediol; 2-methyl-2,4-pentanediol; 2,4-heptanediol; 2-ethyl-1,3-hexanediol; 2,2-dimethyl-1,3-propanediol; 1,4-cyclohexanediol; 1,4-cyclohexanedimethanol; 1,2-bis(hydroxymethyl)cyclohexane; 1,2-bis(hydroxyethyl)cyclohexane; 2,2-dimethyl-3-hydroxypropyl-2,2-dimethyl-3-hydroxypropionate; diethylene glycol; dipropylene glycol; bis hydroxypropyl hydantoins; tris hydroxyethyl isocyanurate; the alkoxylation product of 1 mole of 2,2-bis(4-hydroxyphenyl)propane (i.e., bisphenol-A, and 2 moles of propylene oxide; and the like.

Polyester polyols are generally known and are prepared by conventional techniques utilizing simple diols, triols and higher hydric alcohols known in the art including but not limited to the previously described simple diols, triols, and higher hydric alcohols (optionally, in combination with monohydric alcohols) with polycarboxylic acids. Examples of suitable polycarboxylic acids include: phthalic acid; isophthalic acid; terephthalic acid; trimellitic acid; tetrahydrophthalic acid; hexahydrophthalic acid; tetrachlorophthalic acid; adipic acid; azelaic acid; sebacic acid; succinic acid; malic acid; glutaric acid; malonic acid; pimelic acid; suberic acid; 2,2-dimethylsuccinic acid; 3,3-dimethylglutaric acid; 2,2-dimethylglutaric acid; maleic acid, fumaric acid, itaconic acid; and the like. Anhydrides of the above acids, where they exist, can also be employed and are encompassed by the term "polycarboxylic acid". In addition, certain materials which react in a manner similar to acids to form polyester polyols are also useful. Such materials include lactones such as caprolactone, propylolactone and methyl caprolactone, and hydroxy acids such as hydroxycaproic acid and dimethylolpropionic acid. If a triol or higher hydric alcohol is used, a monocarboxylic acid, such as acetic acid and benzoic acid, may be used in the preparation of the polyester polyol, and for some purposes, such a polyester polyol may be desirable. Moreover, polyester polyols are understood herein to include polyester polyols modified with fatty acids or glyceride oils of fatty acids (i.e., conventional alkyd polyols containing such modification). Another polyester polyol which may be utilized is one prepared by reacting an alkylene oxide such as ethylene oxide, propylene oxide, butylglycidyl ether, and the glycidyl esters of organic acids such as CARDURA-E, with a carboxylic acid to form the corresponding ester.

Polyether polyols are generally known, and are preferred for use in preparing the urethane resin of the present invention. Examples of polyether polyols include the various polyoxyalkylene polyols and mixtures thereof. These can be prepared, according to well-known methods, by condensing an alkylene oxide, or a mixture of alkylene oxides using acid or base catalyzed addition, with a polyhydric initiator or a mixture of polyhydric initiators. Illustrative alkylene oxides include ethylene oxide, propylene oxide, butylene oxide, amylene oxide, aralkylene oxides such as styrene oxide, and the halogenated alkylene oxides such as trichlorobutylene oxide and so forth. The more preferred alkylene oxides include propylene oxide and ethylene oxide or a mixture thereof using random or step-wise oxyalkylation. Examples of polyhydric initiators include ethylene glycol, propylene glycol, diethylene glycol, dipropylene glycol, trimethylolpropane, triethylolpropane, glycerol, pentaerythritol, sorbitol, dextrose, sucrose methyl glucoside, and the like. Examples of polyether polyols also include the generally known poly-(oxytetramethylene) glycols prepared by the polymerization of tetrahydrofuran in the presence of Lewis acid catalysts such as boron trifluoride, tin (IV) chloride, antimony pentachloride, antimonytrichloride, phosphorous pentafluoride, and sulfonyl chloride. Other examples of polyether polyols include the generally known reaction products of 1,2-epoxide-containing compounds with polyols such as those included in the description of simple diols, triols, and higher hydric alcohols above.

Amide-containing polyols are generally known and typically are prepared from any of the above-described diacids or lactones and diols, triols and higher alcohols, and diamines or aminoalcohols as illustrated, for example, by the reaction of neopentyl glycol, adipic acid and hexamethylenediamine. The amide containing polyols also may be prepared through aminolysis by the reaction, for example, of carboxylates, carboxylic acids, or lactones with aminoalcohols. Examples of suitable diamines and aminoalcohols include hexamethylenediamine, ethylenediamine, phenylenediamines, toluenediamines, monoethanolamine, diethanolamine, N-methyl-monoethanolamine, isophorone diamine, 1,8-methanediamine and the like.

Acrylic polyols include but are not limited to the known hydroxyl-functional addition polymers and copolymers of acrylic and methacrylic acids and their ester derivatives including but not limited to their hydroxyl-functional ester derivatives, acrylamide and methacrylamide, and unsaturated nitriles such as acrylonitrile and methacrylonitrile. Additional examples of acrylic monomers which can be addition polymerized to form acrylic polyols include hydroxyethyl (meth)acrylate, hydroxypropyl (meth)acrylate, methyl (meth)acrylate, ethyl (meth)acrylate, propyl (meth)acrylate, isopropyl (meth)acrylate, butyl (meth)acrylate, t-butyl (meth)acrylate, 2-ethylhexyl (meth)acrylate, n-hexyl (meth)acrylate, cyclohexyl (meth)acrylate, 3,3,5-trimethylcyclohexyl (meth)acrylate, decyl (meth)acrylate, isodecyl (meth)acrylate, lauryl (meth)acrylate, stearyl (meth)acrylate, phenyl (meth)acrylate, and isobornyl (meth)acrylate.

Epoxy polyols are generally known and can be prepared, for example, by the reaction of glycidyl ethers of polyphenols such as the diglycidyl ether of 2,2-bis (4-hydroxyphenyl) propane, with polyphenols such as 2,2-bis (4-hydroxyphenyl) propane. Epoxy polyols of varying molecular weights and average hydroxyl functionality can be prepared depending upon the ratio of starting materials used.

Polyhydric polyvinyl alcohols are generally known and can be prepared, for example, by the addition polymerization of vinyl acetate in the presence of suitable initiators followed by hydrolysis of at least a portion of the acetate moieties. In the hydrolysis process, hydroxyl groups are formed which are attached directly to the polymer backbone. In addition to homopolymers, copolymers of vinyl acetate and monomers such as vinyl chloride can be prepared and hydrolyzed in similar fashion to form polyhydric polyvinyl alcohol-polyvinyl chloride copolymers.

Urethane polyols are generally known and can be prepared, for example, by reaction of an organic polyisocyanate with sufficient polyol to form a hydroxyl functional product. Examples of polyisocyanates useful in the preparation of urethane polyols include those described above. Examples of polyols useful in the preparation of urethane polyols include those described above.

The molecular weight of suitable polyols for preparation of the aforesaid urethane resins can vary depending on the nature of the specific classes of polyols as described above chosen for preparation of the urethane resins. The hydroxyl equivalent weight of polyols suitable for preparation of the urethane resins can vary. However, generally polyols having a hydroxyl equivalent weight of from about 200 to about 700 are utilized. Use of polyols having substantially higher hydroxy equivalent weights may cause unacceptable humidity resistance and tensile strength for some applications.

The composition of the present invention further includes an aminoplast resin for reaction with hydroxyl groups of the urethane resin. The aminoplast resin of the present invention is present in the composition in an amount which is effective in curing of the composition. An aminoplast resin is considered to be effective in curing of a composition if the cured composition is harder or more solvent resistant with the aminoplast resin than without it. Curing of compositions is discussed more fully below. More particularly, the aminoplast resin of the present invention is present in the composition in amounts of less than about 10 weight percent, more preferably between about 2 weight percent and about 10 weight percent, and most preferably between about 3 weight percent and about 7 weight percent based on total weight of resin solids. At concentrations significantly greater than about 10 weight percent, use of an aminoplast resin may cause undesirable popping in a coating composition's surface at high film builds.

Aminoplast resins are condensation products of amines, ureas or amides with aldehydes. Examples of suitable amine or amides are melamine, benzoguanamine, urea and similar compounds. Generally, the aldehyde employed is formaldehyde, although products can be made from other aldehydes such as acetaldehyde and furfural. The condensation products contain methylol groups or similar alkylol groups depending on the particular aldehyde employed. Preferably, these methylol groups are etherified by reaction with an alcohol. Various alcohols employed include monohydric alcohols containing from 1 to 4 carbon atoms such as methanol, ethanol, isopropanol and n-butanol, with methanol being preferred. Aminoplast resins are commercially available from American Cyanamid Co. under the trademark CYMEL and from Monsanto Chemical Co. under the trademark RESIMENE. A preferred aminoplast resin is a fully butylated melamine-formaldehyde condensate.

In a preferred embodiment, the composition of the present invention additionally contains a reactive diluent, which is preferably a (meth)acrylate functional compound having at least two (meth)acrylate groups. The reactive diluent should be relatively nonvolatile at curing temperatures for hardening a coating therefrom on a substrate, should be reactive with the reactive ethylenically unsaturated groups on the urethane resin and should be relatively low in molecular weight. While coating compositions of the invention can be obtained having a high solids content (i.e., equal to or greater than 50 percent by weight total solids, preferably equal to or greater than 60 percent by weight total solids) without utilizing a reactive diluent, even higher solids compositions, which may be desirable for some purposes, can be achieved employing a reactive diluent. Moreover, it is believed that a reactive diluent, for example, tetraethyleneglycol dimethacrylate, in preferred compositions of the invention, advantageously allows for even more rapid cure including both cure through the thickness of a thick film and excellent surface cure of the film. The amount of reactive diluent in a coating composition of the invention generally ranges from 0 weight percent to 25 weight percent, preferably from 2 weight percent to 25 weight percent, more preferably from 5 weight percent to 15 weight percent, based on total weight of resin solids of the coating composition.

Examples of the reactive diluent which may be utilized in a composition of the invention include: tetraethyleneglycol dimethacrylate, 2-phenoxyethyl methacrylate, isodecylmethacrylate, hydroxyethyl methacrylate, trimethylolpropane trimethacrylate, ethyleneglycol dimethacrylate, triethyleneglycol trimethacrylate, the reaction product (adduct) of 3 moles of epsilon-caprolactone and 1 mole of hydroxyethyl methacrylate, and the reaction product (adduct) of 1 mole of the glycidyl ester of versatic acid available as CARDURA-E (from Shell Chemical Co.) with 1 mole of methacrylic acid. Of the aforesaid reactive diluents, tetraethyleneglycol dimethacrylate is preferred. It is to be understood that, while not preferred, other monomeric ethylenically unsaturated compounds such as vinyl toluene, divinyl benzene and styrene optionally may be employed in a composition of the invention.

The coating composition of the invention, in a preferred embodiment, can include a thermally activated free radical initiator. In the presence of a thermally activated free-radical initiator, free-radical cure of the coating composition can be effected at temperatures of about 180° F. (82° C.) and greater. Suitable thermally activated free-radical initiators include peroxides, hydroperoxides, azo compounds, peroxy esters and peroxy ketals. Specific examples of such free radical initiators include: benzoyl peroxide, cumyl peroxide, dicumyl peroxide, methylethyl ketone hydroperoxide, lauryl peroxide, cyclohexanone peroxide, di-t-butyl peroxide, di-t-butyl diperoxyphthalate, t-butyl-hydroperoxide, t-butylbenzene hydroperoxide, cumene hydroperoxide, azo bis-isobutyronitrile, 2,t-butylazo-2 cyano-4-methylpentane, 4-t-butylazo-4-cyano-valeric acid, t-butyl perbenzoate, t-butyl peroctoate and t-amyl peracetate. Peroxide initiators are preferred. Any suitable catalytic amount of the thermal free-radical initiator may be employed, however, an amount from about 0.5 percent to about 5 percent by weight based on solids typically is utilized.

To prevent premature cure or gelling of the present composition by free radical polymerization, a free radical inhibitor is typically added to improve stability. For example, butylated hydroxy-toluene, hydroquinone, phenothiazine, or methyl ether hydroquinone can be used. The amount of inhibitor depends on the choice of inhibitor. If butylated hydroxy-toluene is used, it is present in an amount of between about 0.01% by weight on a resin solids basis and 1.0% by weight, more preferably between about 0.05% by weight and about 0.7% by weight, and most preferably between about 0.1% by weight and about 0.4% by weight. By use of a free radical inhibitor as described herein, a stable coating composition can be achieved. For instance, the present composition can be prepared which is stable for at least about 8 hours at 90° F., and more preferably at least about 4 days at 140° F. As used herein, the term stable refers to a composition which does not have unacceptable increases in viscosity within a given time period. For example, a composition which remains sprayable through standard application equipment without excessive dilution is stable. More specifically, a composition which has less than a 400 centipoise increase over a given time period at a given temperature is considered to be stable for that time period and temperature.

In a preferred embodiment, a coating composition of the invention additionally comprises a cure-promoting catalyst different from the aforesaid thermal free-radical initiator, such as a metal soap. Examples of suitable metal soaps include: manganese carboxylates such as manganese octoate, manganese stearate and mixed manganese octoates and stearates; other metal soaps such as cerium stearate, cobalt stearate and copper stearate; methyacryloxy functional zirconium aluminate; and the like. Any suitable amount of such metal soaps may be employed, however, an amount from about 1.5 percent to about 5 percent by weight based on solids typically is utilized.

A coating composition of the invention generally contains one or more pigments and/or fillers (sometimes referred to as extender pigments). The amount of pigment and/or filler generally is selected to provide a pigment to binder ratio of from 0.4:1.1 to 1.1:1.0. It has been found that a pigment to binder ratio higher than about 1.1:1.0 the properties of the coating composition which make it particularly suitable as a chip resistant coating may tend to decrease. As used herein, the term binder refers to the urethane resin, the aminoplast resin, and the reactive diluent, if any, but is not intended to include organic solvents and/or diluents, thermal free-radical initiator, metal drier, pigments and/or fillers and rheology modifiers (e.g., microgel). Examples of pigments and/or fillers which may be used in a coating composition of the invention include: titanium dioxide (e.g. rutile or anatase), zinc oxide, zirconius oxide, zinc sulfide, lithophone, iron oxides, cadmium sulfide, carbon black, phthalocyanine blue, phthalocyanine green, indanthrone blue, ultramarine blue, chromium oxide, burnt umber, benzidine yellow, toluidine red, silicate-treated barium metaborate, strontium chromate, lead chromate, pigmentary silica, barytes, calcium carbonate, barium sulfate, talc, china clay, organoclays such as organo-modified bentone clays, aluminum silicates, sodium aluminum silicates, potassium aluminum silicates, aluminum powder, copper powder, bronze powder, zinc dust, aluminum flakes, nickel flakes, copper flakes, bronze flakes, brass flakes and chromium flakes. The amount of pigments and/or fillers employed in a coating composition of the invention generally can range from about 15 percent to about 70 percent, preferably from about 25 percent to about 60 percent by weight based on total solids of the coating composition. The use of pigment and/or fillers is useful in preparing coating compositions having high solids contents and which have good hold out properties with respect to a subsequently applied coating which is applied wet on wet. The term "hold out" is intended to mean the ability of a composition to not intermix at the interface with another composition.

In addition to the above components, a coating composition of the invention may contain additional ingredients which may be employed in their customary amounts for their customary purposes provided they do not seriously interfere with good coatings practice. Examples of these optional ingredients include various plasticizers; antioxidants; mildewcides and fungicides; surfactants; resinous pigment dispersants or grinding vehicles; various flow control agents including, for example, thixotropes and additives for sag resistance and/or pigment orientation based on organic polymer microparticles (sometimes referred to as microgels) described for example in U.S. Pat. Nos. 4,025,474; 4,055,607; 4,074,141; 4,115,472; 4,147,688; 4,180,489; 4,242,384; 4,268,547; 4,220,679; and 4,290,932 the disclosures of which are hereby incorporated by reference; and other such formulating additives. In a preferred embodiment of the invention, a rheology modifier consisting essentially of polymeric organic microparticles which are insoluble in solvents utilized for the coating composition and which have a diameter in the range of from about 0.01 to about 40 microns is employed in the coating composition in an amount typically ranging from about 0.5 percent to about 10.0 percent by weight based on solids of the composition. Utilization of such polymeric organic microparticles helps improve the hold out characteristics of the composition.

The present invention is further directed toward a method of applying the composition of the present invention to a substrate. This method includes applying a layer of the above-described composition to a substrate and heating the coating at an elevated temperature sufficient to cure the layer and particularly to obtain acceptable thin film cure of the composition. As used herein, the term thin film cure refers to cure of any portion of a layer of the composition which is less than about 1 mil thick. The present composition, either at thin film portions or other portions, is considered to be cured when it is dry and tack-free and solvent resistant. Typically, the cured coating will be able to withstand at least 100 double rubs without removing the coating from the substrate. A double rub is a rub back and forth with a xylene saturated cloth using normal hand pressure. It should be noted that the present composition is useful as a chip resistant coating, also known as a "chip primer". Such chip primers, when fully cured, are somewhat resilient to be able to absorb the impact of debris. Therefore, even when fully cured, such chip primers are not particularly hard.

The present process is particularly useful in conjunction with substrates which have been coated with a cationically electrodeposited composition as a primer. As discussed above, cationically electrodeposited compositions typically can inhibit free radically initiated thermal cure. The present composition, however, can be used to achieve complete cure even when coating a substrate with a cationically electrodeposited primer. The present composition is also useful on other substrates. For example, it can be used to coat steel, aluminum, and reactive injected molding and substrates which are coated with non-electrodeposited sealants or underbody coatings.

The present composition can be applied to a substrate in any manner known in the art. Preferably, the present composition is sprayed onto a substrate. The present composition can be applied in thicknesses up to about 14 mils with acceptable cure characteristics and chip resistance. The optimum maximum thickness of a layer of the present composition is between about 5 and 8 mils. An important aspect of the present invention, however, is that acceptable thin film cure and chip resistance can be obtained such as at the edges of an application zone when the composition is applied to only a portion of the substrate. In such instances, the composition is typically feathered out from its maximum thickness to negligible or zero thickness. At thin film application areas, inhibition of the free radically initiated cure can occur because the inhibitory effect from an electrodeposited primer and/or oxygen is proportionally greater at thin film thickness.

In a preferred use of the present invention, after it is applied to a substrate, and before it is cured, a second coating composition, typically a primer surfacer, is applied in a "wet on wet" manner. After application of the primer surfacer, the coated substrate is cured at elevated temperatures sufficient to harden both layers. In a further embodiment, prior to cure of the present invention and a primer surfacer layer, a third layer, such as an accent color layer can be applied and the three layers subsequently cured.

The present composition has a broad range of cure temperatures. Acceptable cure of thick film layers (>1 mil) can be obtained at temperatures above about 180° F. Acceptable cure of thin film portions of a layer can be achieved at temperatures from about 290° F. to 380° F. for between about 20 minutes and 60 minutes. Preferably, the present composition is cured at a temperature between about 310° F. and 340° F. for about 30 minutes. Subsequent to cure of the present composition and any layers which were applied wet on wet, typically, a topcoat is applied in the case of automotive coatings. For example, a color coat can be applied or a color-plus-clear coating can be applied.

The following examples illustrate the invention and should not be construed as a limitation to the scope thereof.

EXAMPLE 1

This example illustrates the preparation of a polyurethane resin of the present invention containing terminal, reactive ethylenically unsaturated groups and hydroxyl groups for use in preparing a chip resistant coating composition.

A reaction vessel equipped with a stirrer, thermometer, addition funnel, condenser and nitrogen inlet is charged with 1332.0 grams (12.0 equivalents) of isophorone diisocyanate and 1.5 grams (g) of dibutyltin dilaurate and heated to 65 degrees Celsius (°C.). A mixture of 714.4 g (6.16 equivalents) of hydroxyethyl acrylate and 3.8 g of 2,6-di-t-butyl-p-cresol (Ionol from Shell Chemical Company) is added to the reaction vessel over a period of two hours while maintaining the reaction temperature at less than 70° C. After the addition is complete, the addition funnel is rinsed with 80.0 g xylene and the contents of the vessel are allowed to stir for one hour. Then 4.1 g dibutyltin dilaurate is added all at once and 1700.0 g (7.08 equivalents) of NIAX LHT-240 polyol (a polyether triol having a viscosity at 25° C. of about 270 centistokes, an apparent specific gravity at 20°/20° C. of about 1.022 and a hydroxyl value of 230 available from Union Carbide) is added to the reaction vessel over one hour. The addition funnel is rinsed with 267.2 g xylene and the reaction temperature is raised to 70° C. at which the contents of the vessel are allowed to stir for 5 hours. After this time, 60.0 g of n-butanol is added and the contents of the reaction vessel stirred until infrared analysis of a sample of the contents of the vessel shows no evidence of isocyanate. The product has a total solids content measured for 1 hour at 110° C. of 90.1 percent by weight, a viscosity of 116,400 centipoise, an acid value of 1.05 mg KOH/g, and a weight average molecular weight of 3063 and a number average molecular weight of 1640 as determined by gel permeation chromatography utilizing a polystyrene standard.

EXAMPLE 2

This example illustrates the preparation of a polyurethane resin with terminal, reactive ethylenically unsaturated groups without hydroxyl groups which is useful in comparative examples.

A reaction vessel equipped with a stirrer, thermometer, condenser and nitrogen inlet is charged with 888.0 grams (4.0 mol corresponding to 8.0 equivalents) of isophorone diisocyanate, 385.0 grams of tetraethyleneglycol dimethacrylate, 1.7 grams of 2,6-di-t-butyl-p-cresol (available from Shell Chemical Company as Ionol), 2000 grams (2.0 mol corresponding to 4.0 equivalents) of a polyether diol (a poly(tetramethyleneoxide) diol having a molecular weight in the range of 950–1050, a hydroxyl number in the range of 53–59, available as TERETHANE 1000 from E.I. DuPont de Nemours and Company), and 3.4 grams of dibutyltin dilaurate. The contents of the vessel are heated to 50.0 degrees Celsius (°C.) at which temperature heating is discontinued and the reaction is allowed to exotherm to 70° C. While being stirred, the contents of the vessel are maintained at 70° C. until the isocyanate equivalent is greater than 820. Thereafter, the contents of the vessel are cooled to 50° C. whereupon a mixture of 572.0 grams of hydroxyethyl methacrylate (4.4 mol) and 1.7 grams of Ionol is added to the contents of the reaction vessel, and the temperature again is increased to 70° C. While stirring, the contents of the vessel are maintained at 70° C. until infrared spectral analysis of a sample of the contents of the vessel shows no evidence of isocyanate. The resultant product contains a polyurethane resin having terminal, reactive ethylenically unsaturated groups, in combination with tetraethyleneglycol dimethacrylate. The product has a total solids content measured for 2 hours at 150° C. of 99.3 percent by weight, a viscosity of 33,000 centipoise and a weight per gallon of 8.82.

EXAMPLE 3

This example illustrates the preparation of a polyurethane resin with terminal, reactive ethylenically unsaturated groups without hydroxyl groups which is useful in comparative examples.

A reaction vessel equipped with a stirrer, thermometer, condenser, addition funnel and nitrogen inlet is charged with 1111.6 grams (5.00 mol corresponding to 10.0 equivalents) of isophorone diisocyanate and 1.0 grams (g) of dibutyltin dilaurate and heated to 65° C. A mixture of 593.9 g (5.12 mol) of hydroxyethyl acrylate and 2.8 g of 2,6-di-t-butyl-p-cresol (Ionol from Shell Chemical Company) is added to the reaction vessel over a period of two hours while maintaining the reaction temperature at less than 70° C. After the addition is complete, the contents of the vessel are allowed to stir for one hour after which time 1.8 g of dibutyltin dilaurate is added all at once and 1315.4 g (5.36 equivalents) of NIAX LHT-240 polyol (a polyether triol having a viscosity at 25° C. of about 270 centistokes, an apparent specific gravity at 20°/20° C. of about 1.022 and a hydroxyl value of 228.6 available from Union Carbide) is added to the reaction vessel over 1 hour. The addition funnel is rinsed with 320.0 g of xylene and the reaction temperature is raised to 70° C. at which temperature the contents of the vessel are allowed to stir while the reduced viscosity (3 pbw resin/1 pbw xylene) is monitored. After the contents of the vessel reach a Gardner-Holdt bubble tube viscosity of J–K, 60.0 g of n-butanol is added and the contents of the reaction vessel stirred until infrared spectral analysis of a sample of the contents of the vessel shows no evidence of isocyanate. The resultant product contains a polyurethane resin having terminal, reactive ethylenically unsaturated groups. The product has a total solids content measured for 1 hour at 110° C. of 89.6 percent by weight, a viscosity of 113,000 centipoise, and a weight average molecular weight of 3015 and a number average molecular weight of 1199 as determined by gel permeation chromatography utilizing a polystyrene standard.

The following Examples 4–9 illustrate various coating compositions using the polyurethane resins of Examples 1–3.

EXAMPLE 4

A coating composition of the present invention having a urethane resin with excess hydroxyl groups, an aminoplast resin and a free radical initiator is prepared as described below.

| Coating Composition | Parts by weight |
| --- | --- |
| (1) Xylene | 9.498 |
| (2) Manganese accelerator(a) | 0.169 |
| (3) Fumed Silica(b) | 1.639 |
| (4) Pigment Wetting Aid(c) | 0.658 |
| (5) Polyurethane resin of Example 1 | 26.157 |
| (6) Titanium dioxide | 3.196 |
| (7) Barytes | 27.371 |
| (8) Carbon Black | 0.039 |
| (9) Tetraethylene glycol dimethacrylate | 3.873 |
| (10) Xylene | 5.039 |
| (11) 2,6-di-t-butyl-p-cresol | 0.087 |
| (12) Methanol | 0.439 |
| (13) Polymeric microparticles(d) | 2.573 |
| (14) Di-t-butyl diperoxyphthalate(e) | 1.257 |
| (15) Melamine formaldehyde resin(f) | 2.418 |
| (16) Polyurethane resin of Example 2 | 15.586 |

(a)An accelerator containing 12% by weight manganese in combination with fatty acid esters; available as 12% Noury Dry Mn from Hüls America.
(b)Available as R-972 Aerosil from DeGussa.
(c)Pigment wetting aid available as Anti-Terra-U from Byk Chemie.

| Coating Composition | Parts by weight |
|---|---|
| (d)A dispersion of organic polymer microparticles at 44 percent by weight solids in 56 percent by weight of a solvent mixture (containing 30.0 percent of an aliphatic hydrocarbon solvent obtained as ISOPAR E from EXXON Corp. and 70.0 percent heptane). The dispersion of organic polymer microparticles is prepared as follows. A reaction vessel equipped with a stirrer, thermometer, condenser, addition funnel and nitrogen inlet is charged with 630.0 grams (g) of n-heptane and 85.6 g of ISOPAR E and heated to reflux. A solution of 50.9 g methyl methacrylate, 4.3 g 2,2'-azobis(2-methylbutanenitrile), 99.7 g of a nonaqueous dispersion stabilizer and 184.2 g ISOPAR E is added all at once to the reaction vessel. The light transmission value of the reaction mixture is checked every 10 minutes until the value is 60–70 (n-heptane standard is 100%). Then a solution of 298.7 g methyl methacrylate, 730.4 g ethyl acrylate, 310.4 g hydroxyethyl methacrylate, 43.3 g methacrylic acid, 12.7 g 2,2'-azobis(2-methylbutanenitrile), 253.1 g of the nonaqueous dispersion stabilizer, 3.7 g n-octylmercaptan, 4.2 g dimethylcocoamine, 630.0 g n-heptane, and 269.8 g ISOPAR E is added over a 4 hours through the reflux condenser. After the addition is completed, the funnel is rinsed with 51.7 g n-heptane and 22.0 g ISOPAR E. The contents of the vessel are stirred for an additional hour and cooled to ambient temperature. The resultant product has an acid value of 5.87 mg KOH/g; and as residual contents of ethyl acrylate, glycidyl methacrylate and methyl methacrylate, respectively, of 0.95%, 0.01% and 0.03% by weight. The dispersion stabilizer used herein is in the form of a solution containing 40 percent by weight solids and 60 percent by weight of a mixture of solvents. The dispersion stabilizer is a polymer prepared by graft polymerizing 49.5 percent by weight of a reaction product of 10.8 percent by weight of glycidyl methacrylate and 89.2 percent by weight 12-hydroxystearic acid, with 45.4 percent by weight of methyl methacrylate and 4.2 percent by weight of glycidyl methacrylate, wherein the resulting copolymer product containing pendant epoxy groups is reacted with 0.9 percent by weight of methacrylic acid. The mixture of solvents of the dispersion stabilizer solution contains 68.5 percent by weight of butyl acetate, 26.3 percent by weight of VM & P naphtha, and 5.2 percent by weight of toluene. The teachings of U.S. Pat. No. 4,147,688 relating to the dispersion of organic polymer microparticles are hereby incorporated by reference. | |
| (e)A 40% solution of Di-t-butyl-diperoxyphthalate in dibutylphthalate. | |
| (f)Available as Cymel 1156 from American Cyanamid. | |

Components 1 through 3 are premixed to remove air. Components 4 through 9 are then added with agitation and ground to a pigment particle size of 7 Hegman. Components 10 through 13 are added to the grind and the paste is ground to a particle size of 6.5 Hegman. Components 14 through 16 are then added to form a coating composition.

EXAMPLE 5

A coating composition of the present invention having a urethane resin with excess hydroxyl and an aminoplast resin is prepared as described below.

| Coating Composition | Parts by weight |
|---|---|
| (1) Xylene | 9.616 |
| (2) Manganese accelerator(a) | 0.172 |
| (3) Fumed Silica(b) | 1.660 |
| (4) Pigment Wetting Aid(c) | 0.668 |
| (5) Polyurethane resin of Example 1 | 26.493 |
| (6) Titanium dioxide | 3.239 |
| (7) Barytes | 27.720 |
| (8) Carbon Black | 0.038 |
| (9) Tetraethylene glycol dimethacrylate | 3.921 |
| (10) Xylene | 5.104 |
| (11) 2,6-di-t-butyl-p-cresol | 0.089 |
| (12) Methanol | 0.445 |
| (13) Polymeric microparticles(d) | 2.604 |
| (14) Melamine formaldehyde resin(e) | 2.447 |
| (15) Polyurethane of Example 2 | 15.784 |

(a)An accelerator containing 12% by weight manganese in combination with fatty acid esters; available as 12% Noury Dry Mn from Hüls America.
(b)Available as R-972 Aerosil from DeGussa.
(c)Pigment wetting aid available as Anti-Terra-U from Byk Chemie.

| Coating Composition | Parts by weight |
|---|---|
| (d)A dispersion of organic polymer microparticles as described for element 13 of Example 1. | |
| (e)Available as Cymel 1156 from American Cyanamid. | |

Components 1 through 3 are premixed to remove air. Components 4 through 9 are then added with agitation and ground to a pigment particle size of 7 Hegman. Components 10 through 13 are added to the grind and the paste is ground to a particle size of 6.5 Hegman. Components 14 through 15 are then added to form the coating composition.

EXAMPLE 6

A comparative coating composition with a urethane resin having excess hydroxyl and a free radical initiator, but with a non-aminoplast crosslinker is prepared as described below.

| Coating Composition | Parts by weight |
|---|---|
| (1) Xylene | 9.402 |
| (2) Manganese accelerator(a) | 0.168 |
| (3) Fumed Silica(b) | 1.623 |
| (4) Pigment Wetting Aid(c) | 0.651 |
| (5) Polyurethane resin of Example 1 | 25.894 |
| (6) Titanium dioxide | 3.164 |
| (7) Barytes | 27.095 |
| (8) Carbon Black | 0.038 |
| (9) Tetraethylene glycol dimethacrylate | 3.835 |
| (10) Xylene | 4.988 |
| (11) 2,6-di-t-butyl-p-cresol | 0.087 |
| (12) Methanol | 0.435 |
| (13) Polymeric microparticles(d) | 2.547 |
| (14) Di-t-butyl diperoxyphthalate(e) | 1.245 |
| (15) Trixene DP8744(f) | 3.399 |
| (16) Polyurethane resin of Example 2 | 15.429 |

(a)An accelerator containing 12% by weight manganese in combination with fatty acid esters; available as 12% Noury Dry Mn from Hüls America.
(b)Available as R-972 Aerosil from DeGussa.
(c)Pigment wetting aid available as Anti-Terra-U from Byk Chemie.
(d)A dispersion of organic polymer microparticles as described for element 13 of Example 1.
(e)A 40% solution of Di-t-butyl-diperoxyphthalate in dibutylphthalate.
(f)A trifunctional blocked isocyanate available from Baxendem.

Components 1 through 3 are premixed to remove air. Components 4 through 9 are then added with agitation and ground to a pigment particle size of 7 Hegman. Components 10 through 13 are added to the grind and the paste is ground to a particle size of 6.5 Hegman. Components 14 through 16 are then added to form the coating composition.

EXAMPLE 7

A comparative coating composition with a urethane resin with excess hydroxyl and a free radical initiator but without an aminoplast resin is prepared as described below.

| Coating Composition | Parts by weight |
|---|---|
| (1) Xylene | 9.731 |
| (2) Manganese accelerator(a) | 0.174 |
| (3) Fumed Silica(b) | 1.681 |
| (4) Pigment Wetting Aid(c) | 0.673 |
| (5) Polyurethane resin of Example 1 | 26.802 |
| (6) Titanium dioxide | 3.277 |
| (7) Barytes | 28.049 |
| (8) Carbon Black | 0.038 |
| (9) Tetraethylene glycol dimethacrylate | 3.969 |
| (10) Xylene | 5.165 |
| (11) 2,6-di-t-butyl-p-cresol | 0.089 |
| (12) Methanol | 0.451 |

| Coating Composition | Parts by weight |
| --- | --- |
| (13) Polymeric microparticles(d) | 2.636 |
| (14) Di-t-butyl diperoxyphthalate(e) | 1.290 |
| (15) Polyurethane resin of Example 2 | 15.429 |

(a) An accelerator containing 12% by weight manganese in combination with fatty acid esters; available as 12% Noury Dry Mn from Hüls America.
(b) Available as R-972 Aerosil from DeGussa.
(c) Pigment wetting aid available as Anti-Terra-U from Byk Chemie.
(d) A dispersion of organic polymer microparticles as described for element 13 of Example 1.
(e) A 40% solution of Di-t-butyl-diperoxyphthalate in dibutylphthalate.

Components 1 through 3 are premixed to remove air. Components 4 through 9 are then added with agitation and ground to a pigment particle size of 7 Hegman. Components 10 through 13 are added to the grind and the paste is ground to a particle size of 6.5 Hegman. Components 14 through 15 are then added to form the coating composition.

EXAMPLE 8

A comparative coating composition having an aminoplast resin and a urethane resin without excess hydroxyl is prepared as described below.

| Coating Composition | Parts by weight |
| --- | --- |
| (1) Polyurethane resin of Example 3 | 21.689 |
| (2) Xylene | 9.409 |
| (3) Tetraethylene glycol dimethacrylate | 10.329 |
| (4) Polyurethane resin of Example 2 | 14.746 |
| (5) Manganese accelerator(a) | 0.165 |
| (6) Titanium dioxide | 3.161 |
| (7) Barytes | 27.101 |
| (8) Carbon Black | 0.055 |
| (9) Fumed Silica(b) | 1.085 |
| (10) Xylene | 2.071 |
| (11) Polymeric microparticles(c) | 2.551 |
| (12) Pigment Wetting Aid(d) | 0.650 |
| (13) Di-t-butylperoxyphthalate solution(e) | 1.306 |
| (14) 2,6-di-t-butyl-p-cresol | 0.044 |
| (15) Methanol | 0.221 |
| (16) Xylene | 2.916 |
| (17) Melamine formaldehyde resin(f) | 2.501 |

(a) An accelerator containing 12% by weight manganese in combination with fatty acid esters; available as 12% Noury Dry Mn from Hüls America.
(b) Available as R-812 Aerosil from DeGussa.
(c) A dispersion of organic polymer microparticles as described for element 13 of Example 1.
(d) Pigment wetting aid available as Anti-Terra-U from Byk Chemie.
(e) A 40% solution of Di-t-butyl-diperoxyphthalate in dibutylphthalate.
(f) Available as Cymel 1156 from American Cyanamid.

Components 1 through 5 are premixed. Components 6 through 9 are then added with agitation and ground to a pigment particle size of 7 Hegman. Components 10 through 13 are added to the grind and the paste is ground to a particle size of 6.5 Hegman. Components 14 through 17 are then added to form the coating composition.

EXAMPLE 9

A comparative coating composition having a urethane resin without excess hydroxyl and no aminoplast resin is prepared as described below.

| Coating Composition | Parts by weight |
| --- | --- |
| (1) Xylene | 9.650 |
| (2) Polyurethane resin of Example 3 | 22.241 |
| (3) Manganese accelerator(a) | 0.167 |
| (4) Tetraethylene glycol dimethacrylate | 10.599 |
| (5) Polyurethane resin of Example 2 | 15.127 |
| (6) Titanium dioxide | 3.244 |
| (7) Barytes | 27.800 |
| (8) Carbon Black | 0.055 |
| (9) Fumed Silica(b) | 1.112 |
| (10) Xylene | 2.124 |
| (11) Pigment Wetting Aid(c) | 0.669 |
| (12) Polymeric microparticles(d) | 2.613 |
| (13) Di-t-butylperoxyphthalate solution(e) | 1.338 |
| (14) 2,6-t-butyl-p-cresol | 0.045 |
| (15) Methanol | 0.224 |
| (16) Xylene | 2.992 |

(a) An accelerator containing 12% by weight manganese in combination with fatty acid esters; available as 12% Noury Dry Mn from Hüls America.
(b) Available as R-812 Aerosil from DeGussa.
(c) Pigment wetting aid available as Anti-Terra-U from Byk Chemie.
(d) A dispersion of organic polymer microparticles as described for element 13 of Example 1.
(e) A 40% solution of Di-t-butyl-diperoxyphthalate in dibutylphthalate.

Components 1 through 5 are premixed. Components 6 through 9 are then added with agitation and ground to a pigment particle size of 7 Hegman. Components 10 through 13 are added to the grind and the paste is ground to a particle size of 6.5 Hegman. Components 14 through 16 are then added to form the coating composition.

Coating compositions from Examples 4–9 were applied to each of three substrates and tested for thin film (<1 mil) cure and thick film (>1 mil) cure. Two substrates were coated with commercially available cationic electrodeposition primers. One is sold by Dupont under the trademark CORMAX and the other is available from PPG Industries, Inc. as ED-4. The third substrate used was bare steel. The compositions were spray applied in film thickness of from 0–5 mils. The panels were then baked for 30 minutes at 325° F. The panels were then tested for tackiness and solvent resistance (resistance to 50 xylene double rubs) in the thin film areas. The results for thin film cure are shown below in Table 1. All compositions, except for Example 5, showed good thick film properties of adhesion and smoothness. The composition of Example 5, however, exhibited severe wrinkling and lack of adhesion.

TABLE 1

| | Thin Film Cure (<1 mil) | | | | | |
| --- | --- | --- | --- | --- | --- | --- |
| | CORMAX Primer | | ED-4 Primer | | Bare Steel | |
| Composition | Tackiness | Solvent Resistance | Tackiness | Solvent Resistance | Tackiness | Solvent Resistance |
| 4 | tack free | yes | tack free | yes | tack free | yes |
| 5 | tack free | yes | tack free | yes | tack free | yes |
| 6 | tack free | no | tack free | yes | tack free | yes |
| 7 | tack free | no | tack free | yes | tack free | yes |
| 8 | wet | — | wet | — | tack free | yes |
| 9 | wet | — | wet | — | tack free | yes |

As can be seen from the results in Table 1, the compositions of the present invention in Examples 4 and 5 outperform the comparative compositions on substrates which are coated with a cationically electrodeposited primer. The compositions of Examples 4 and 5 have good cure characteristics while the comparative examples had unacceptable cure on one or both of the coated substrates.

What is claimed is:

1. A method of applying a chip resistant coating to a substrate comprising:

(a) spray applying a layer of a coating composition to said substrate, said layer being of a graduated thickness with maximum thickness being between 5 and up to 14 mils thick, said layer being feathered out from its maximum thickness to a thickness less than about 1 mil; said coating composition comprising a urethane resin containing thermally reactive ethylenically unsaturated groups and hydroxyl groups and an aminoplast resin for reaction with hydroxyl groups of said urethane resin, wherein said aminoplast resin is present in an amount between about two and about 10% by weight based on total resin solids of said coating composition; and (b) heating said coating composition at a temperature above 180° F. sufficient to cure said coating composition across the entire layer.

2. A method, as claimed in claim 1, wherein prior to said step of applying said coating composition, said substrate is coated with a cationically electrodeposited coating composition.

3. A method, as claimed in claim 1, further comprising, prior to heating said layer of said coating composition, applying thereon a layer of a second different coating composition and wherein said step of heating cures both coating compositions.

4. A method, as claimed in claim 1, wherein said coating composition comprising a urethane resin further comprises a thermally activated free radical initiator.

5. A method, as claimed in claim 4, wherein said coating composition comprising a urethane resin further comprises a cure-promoting catalyst different from said free radical initiator.

6. A method, as claimed in claim 5, wherein said cure-promoting catalyst different from said free radical initiator comprises a metal soap.

7. A method, as claimed in claim 1, wherein said coating composition comprising a urethane resin further comprises a reactive diluent.

* * * * *